Patented Mar. 12, 1929.

1,704,751

UNITED STATES PATENT OFFICE.

MARTIN LUTHER, OF MANNHEIM, AND HERMANN JOCHHEIM, OF LUDWIGSHAFEN-ON-THE-RHINE, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY.

SEPARATION OF COMPOUNDS FROM MIXTURES OF OXYGEN-CONTAINING ORGANIC COMPOUNDS.

No Drawing. Application filed February 3, 1927. Serial No. 165,750, and in Germany January 29, 1926.

The present invention relates to the separation of mixtures of oxygen-containing organic compounds such as are obtained by the catalytic hydrogenation of oxids of carbon which mixtures are of a very complex nature, and similar mixtures of any other origin, into components or fractions of increased commercial value. We have discovered methods of effecting such separation and improvement of the mixture in question and either one or more of these methods may be applied to the mixture.

We have found that the valuable alcohols may readily be isolated from the said mixtures or similar products of higher boiling point by subjecting the mixtures, or individual fractions of the same, to dehydrogenation and thereby converting the alcohols contained therein into the corresponding aldehydes. These aldehydes, which have substantially lower boiling points than the alcohols, can readily be separated from the other constituents, for example by distillation or by treatment with bisulfite. The aldehydes obtained can thereafter be reconverted into the alcohols by catalytic hydrogenation in any known or suitable manner. Or the aldehydes contained in the dehydrogenation products may be directly oxidized to the corresponding acids and the latter separated from the mixtures for example in the form of salts.

Another way of separating components or fractions from the said mixtures consists in allowing completely or partially dehydrated hydrate-forming salts, such as dehydrated magnesium chlorid, calcium chlorid, calcium nitrate and the like to act upon the hydrogenation products. On cooling, preferably accompanied by an addition of a suitable precipitating agent, such as benzine, molecular compounds separate out, which may be easily separated from the unaltered constituents by filtration. The molecular compounds are decomposed into their components by merely adding water. The oxygenous hydrogenation products from carbon oxids thus liberated are lighter in color and of more agreeable odour than the original mixture; and, for the most part, boil at lower temperatures than the latter.

Another way of effecting separation is the following one: The ketones formed by the catalytic hydrogenation of the oxids of carbon, or other high molecular, saturated or unsaturated ketones, are recovered in a simple manner and in a pure state, from mixtures containing the same by treating these mixtures with mineral acids in the presence of water. All that is necessary, is, for example, a simple washing of these mixtures with aqueous solutions of mineral acids, these solutions, such as aqueous sulfuric acid, hydrochloric acid and the like being preferably brought into contact with the mixtures containing the ketones on the counterflow principle. The concentration and the amount of acid solution to be used depends on the nature of the ketone or ketones to be recovered and on the acid employed and may readily be ascertained by a simple test.

In case of ketone mixtures containing water, it is often practicable to employ anhydrous mineral acids, such as gaseous hydrochloric acid, the mixture being treated with as much of the hydrochloric acid gas as can be absorbed by the water present. If the resulting aqueous hydrochloric acid be insufficient in quantity to absorb the ketones, water, or the lacking amount of aqueous hydrochloric acid, may be added prior to or at the same time as the hydrochloric acid gas.

This further treatment of the aforesaid mixtures with mineral acid solutions, is effected most simply when only constituents which are insoluble in water and in aqueous mineral acids are contained in the mixture in addition to the ketones. In such cases, it is only necessary, after the treatment with aqueous mineral acids, to separate the aqueous solution containing the acid and the ketones from the insoluble constituents, render the aqueous solution alkaline or dilute it with water, and thereby separate the ketones. The ketones may also be recovered form the acid solution by distillation with or without the aid of steam. If the mixtures containing ketones also contain constituents which are soluble in water, or aqueous mineral acids, such constituents are preferably eliminated, prior to the treatment with mineral acids, for example by distillation or in some cases by extraction with water.

The following examples will further illustrate how the said invention may be carried out in practice but the invention is not limited to these examples.

Example 1.

A fraction, boiling at 120° to 150° C., of a product containing oxygen obtained by the hydrogenation of carbon monoxid is passed, at a temperature of 460° C., over a lithopone deposited on pumice. A considerable amount of hydrogen is split off. The resulting dehydrogenation product is agitated with sodium bisulphite solution and, after separation from the oily layer, the aqueous layer is decomposed by sodium carbonate, and the oil thereby separated is then washed, dried and distilled. The bulk of the separated aldehyde mixture consists of methyl-ethyl-acetaldehyde, boiling at 90° to 92° C., whilst the remainder contains an inocapronaldehyde. The methyl-ethyl-acetaldehyde may be readily hydrogenated to methyl-ethyl-methanol, boiling point 128° C., by passing it, in mixture with hydrogen, over nickel-permutite.

Example 2.

The fraction, boiling between 150° and 250° C. of the hydrogenation product of carbon monoxid, prepared for example by passing a mixture of one volume of carbon oxid with more than one volume of hydrogen at a temperature above 200° C. and at a pressure above about 50 atmospheres over a catalytic substance containing a metal oxid which is not reducible under the conditions of working, and consisting mainly of a mixture of hydrocarbons, aliphatic alcohols, aldehydes, ketones and condensation products thereof, is stirred with an equal weight of dry, powdered calcium chlorid, whereupon the greater part of the calcium chlorid passes into solution, with evolution of heat. The mixture is then well cooled and treated with benzine, a molecular compound of calcium chlorid and part of the oxygenous hydrogenation products of carbon monoxid being precipitated. This is filtered off and washed with benzine; and on being treated with water, furnishes a pale, oily product, equivalent to about 50% of the dark-colored original material. About one half of this product boils below 170° C. whereas the bulk of the portion which does not combine with calcium chlorid has a higher boiling point.

Example 3.

An initial material of the kind referred to in Example 2 is mixed with the same amount, by weight, of zinc chlorid. The salt dissolves with a strong evolution of heat. The solution is cooled and precipitated by means of benzine, whereby a compound is obtained which when decomposed with water, separates a light colored oil of lower boiling point than the initial material.

Example 4.

An initial material as described in Example 2 is ground with the same amount of finely powdered anhydrous magnesium chlorid, whereby a considerable portion of the salt is dissolved. The mixture is worked up as described in Example 2.

Example 5.

An oily product boiling at 146° to 148° C., obtained by the catalytic hydrogenation of oxids of carbon and refined, as far as possible, by distillation, is agitated with an equal quantity of an aqueous solution of sulfuric acid of about 35 per cent strength. 21 per cent of a ketone, boiling at 146 to 148° C., can be recovered from the resulting sulfuric acid solution by distillation.

Example 6.

A fraction, boiling at about 160° C., of an oily product obtained by the catalytic hydrogenation of oxids of carbon, is agitated with aqueous hydrochloric acid. Abundant quantities of a ketone boiling at 160° C. can be recovered from the resulting hydrochloric acid solution.

From the fractions, boiling at 190° C., of the oily products obtained by the catalytic hydrogenation of oxids of carbon, about 20 per cent of an unsaturated ketone, $C_8H_{12}O$, can be recovered by washing with an equal quantity of a hydrogen haloid of 20 per cent or higher strength.

We claim:

1. The process for the separation of compounds or fractions from the oily mixtures of oxygen-containing organic compounds of the kind obtainable by the catalytic hydrogenation of oxids of carbon which consists in subjecting them to dehydrogenation and separating the product thus obtained.

2. A process for the separation of compounds or fractions from the oily mixtures of oxygen-containing organic compounds of the kind obtainable by the catalytic hydrogenation of oxids of carbon, which consists in subjecting them to dehydrogenation, oxidizing the aldehydes thus formed to acids and separating the latter in the form of salts.

In testimony whereof we have hereunto set our hands.

MARTIN LUTHER.
HERMANN JOCHHEIM.